(12) United States Patent
Zhang et al.

(10) Patent No.: US 10,147,057 B2
(45) Date of Patent: Dec. 4, 2018

(54) SYSTEMS AND METHODS FOR FLOOD ZONE MODELING

(71) Applicant: Intermap Technologies, Inc., Englewood, CO (US)

(72) Inventors: Qiaoping Zhang, Calgary (CA); Jiří Vohlídal, Dubec (CZ); Jan Roubalik, Michle (CZ); Yue Huang, Calgary (CA); Michael John Wollersheim, Calgary (CA); Ivan Pierre Maddox, Denver, CO (US); Ladislav Garassy, Brevnov (CZ); Stephen Charles Griffiths, Calgary (CA)

(73) Assignee: Intermap Technologies Inc., Englewood, CO (US)

( * ) Notice: Subject to any disclaimer, the term of this patent is extended or adjusted under 35 U.S.C. 154(b) by 382 days.

(21) Appl. No.: 14/825,806

(22) Filed: Aug. 13, 2015

(65) Prior Publication Data

US 2016/0047099 A1    Feb. 18, 2016

Related U.S. Application Data

(60) Provisional application No. 62/036,943, filed on Aug. 13, 2014.

(51) Int. Cl.
*G06Q 10/04* (2012.01)
*E02B 3/00* (2006.01)

(52) U.S. Cl.
CPC .............. *G06Q 10/04* (2013.01); *E02B 3/00* (2013.01); *Y02A 10/46* (2018.01)

(58) Field of Classification Search
CPC ........ G06Q 90/00; G06Q 30/02; G06Q 40/08; E03B 1/00; E21B 43/16; G06F 19/32; G01T 1/2928
See application file for complete search history.

(56) References Cited

U.S. PATENT DOCUMENTS

| | | |
|---|---|---|
| 6,448,544 B1 * | 9/2002 | Stanton ................. G01T 1/2928 250/208.1 |
| 7,627,491 B2 | 12/2009 | Feyen et al. |
| 7,917,292 B1 * | 3/2011 | Du ......................... G06Q 90/00 702/5 |
| 8,655,595 B1 * | 2/2014 | Green ..................... G06Q 90/00 702/5 |
| 2011/0246935 A1 * | 10/2011 | Maeder ..................... E03B 1/00 715/809 |

(Continued)

*Primary Examiner* — Kandasamy Thangavelu
(74) *Attorney, Agent, or Firm* — Perkins Coie LLP

(57) ABSTRACT

Implementations described and claimed herein provide systems and methods for flood hazard zone modeling. In one implementation, one or more relevant stream segments are identified from an input stream network. One or more cross profiles are defined for one or more selected points on the relevant stream segments, with the selected points located within a flood hazard area. A high resolution flood level elevation map is generated by interpolating flood level elevation from the selected points. A flood depth map is generated having a flood depth value for each of the selected points computed as a difference between the high resolution flood level elevation map and a terrain elevation. One or more flood zones are defined in the flood depth map. The flood zones have a positive flood depth for a return period.

19 Claims, 15 Drawing Sheets

(56) References Cited

U.S. PATENT DOCUMENTS

| | | | | |
|---|---|---|---|---|
| 2011/0295575 A1* | 12/2011 | Levine | ............ | G06Q 30/02 |
| | | | | 703/2 |
| 2012/0330553 A1* | 12/2012 | Mollaei | ............ | E21B 43/16 |
| | | | | 702/11 |
| 2013/0197807 A1* | 8/2013 | Du | ............ | G06Q 40/08 |
| | | | | 702/5 |
| 2015/0046139 A1* | 2/2015 | Iwamura | ............ | G06F 19/32 |
| | | | | 703/11 |

* cited by examiner

SYSTEMS AND METHODS FOR FLOOD ZONE MODELING

CROSS-REFERENCE TO RELATED APPLICATIONS

The present application claims benefit under 35 U.S.C. § 119(e) to U.S. Provisional Patent Application No. 62/036,943, entitled "SYSTEMS AND METHODS FOR FLOOD ZONE MODELING" and filed on Aug. 13, 2014, which is specifically incorporated by reference herein in its entirety.

TECHNICAL FIELD

Aspects of the present disclosure relate to data aggregation and analysis for flood modeling services, among other functions, and more particularly to the identification, modeling, and analysis of flood hazard zones.

BACKGROUND

Flooding is one of the most common and costly hazards in the United States and other countries, occurring even in extremely dry areas. A fluvial flood is an event involving an overflow of the natural or artificial banks of one or more bodies of water having a current. Flooding typically results from large scale weather systems generating prolonged rainfall, rapid snow melt or on-shore winds that temporarily produce a partial or complete inundation of normally dry land areas. There are a range of flood types or levels determined by the probability that a volume of water capable of flooding a particular area will enter during a return period (e.g., 1 year, 50 years, 100 years, etc.). For example, an annual flood is a type of flooding event expected to occur in any given year, and a 100 year flood has a one percent chance of occurring in any given year.

Flood modeling may be used to determine the probability of a flooding event for a particular area for risk assessment, planning, mitigation, prevention, insurance portfolio analysis, damage estimation, and/or the like. Generally, conventional flood models are derived from elevation models. Stated differently, based on the assumption that water flows downhill, many traditional flood models accumulate water in crevices or areas having low elevations, including streams, to determine a volume of water accumulated in a given area for an input of water, thereby determining a depth of flooding for a particular point during a return period. Often, with conventional flood modeling, there is a tradeoff between resolution and accuracy of the flood model and time and resources expended in creating the flood model. For example, some traditional flood models are highly dense, involving multiple high resolution datasets, such as elevation datasets, for each location point in various geographic areas. Creating such flood models often involves considerable resources expended over several years. Conversely, other traditional models involve low resolution datasets. Such models may have a lower accuracy but may be created using less time and resources.

It is with these observations in mind, among others, that various aspects of the present disclosure were conceived and developed.

SUMMARY

Implementations described and claimed herein address the foregoing problem, among others, by providing systems and methods for flood modeling. In one implementation, one or more relevant stream segments are identified from an input stream network. One or more cross profiles are defined for one or more selected points on the relevant stream segments, with the selected points located within a flood hazard area. A high resolution flood level elevation map is generated by interpolating flood level elevation from the selected points. A flood depth map is generated having a flood depth value for each of the selected points computed as a difference between the high resolution flood level elevation map and a terrain elevation. One or more flood zones are defined in the flood depth map. The flood zones have a positive flood depth for a return period.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for generating flood hazard zone models. Generally, an elevation dataset is evaluated on a point by point basis using one or more input layers, including hydrographic and watershed boundary datasets to generate a flood hazard zone model for a large scale area. The presently disclosed technology efficiently generates highly accurate flood hazard zone models and reduces the trade-off between resolution and accuracy of the flood models and the time and resources expending in generating the flood models.

In one aspect, hydrographic and watershed boundary dataset vectors are used to identify relevant stream segments and create a stream hierarchical structure. Input parameters for determining flood level elevation (FLE) are generated based on the relevant stream segments and hierarchical structure. An area around a particular stream is modeled to produce the flood hazard zone. The modeling area is defined based on the relevant stream segments, the Strahler Order of the particular and surrounding streams, an accumulation area of water at a point in the stream hierarchical structure, the type of stream segment of the particular stream (e.g., river segment or sewer pipeline) and locations of watershed boundaries corresponding to segments of the particular stream. One or more cross profiles are defined based on the stream characteristics. Sample elevation points are selected along the cross-profiles. The sample points may be used for statistical calibration of modeling parameters for the modeled area. Based on the calibrated modeling parameters, a flood level elevation is determined for each return period. A flood zone model is generated by combining the flood level elevation with an elevation modeling dataset.

Figure 1:
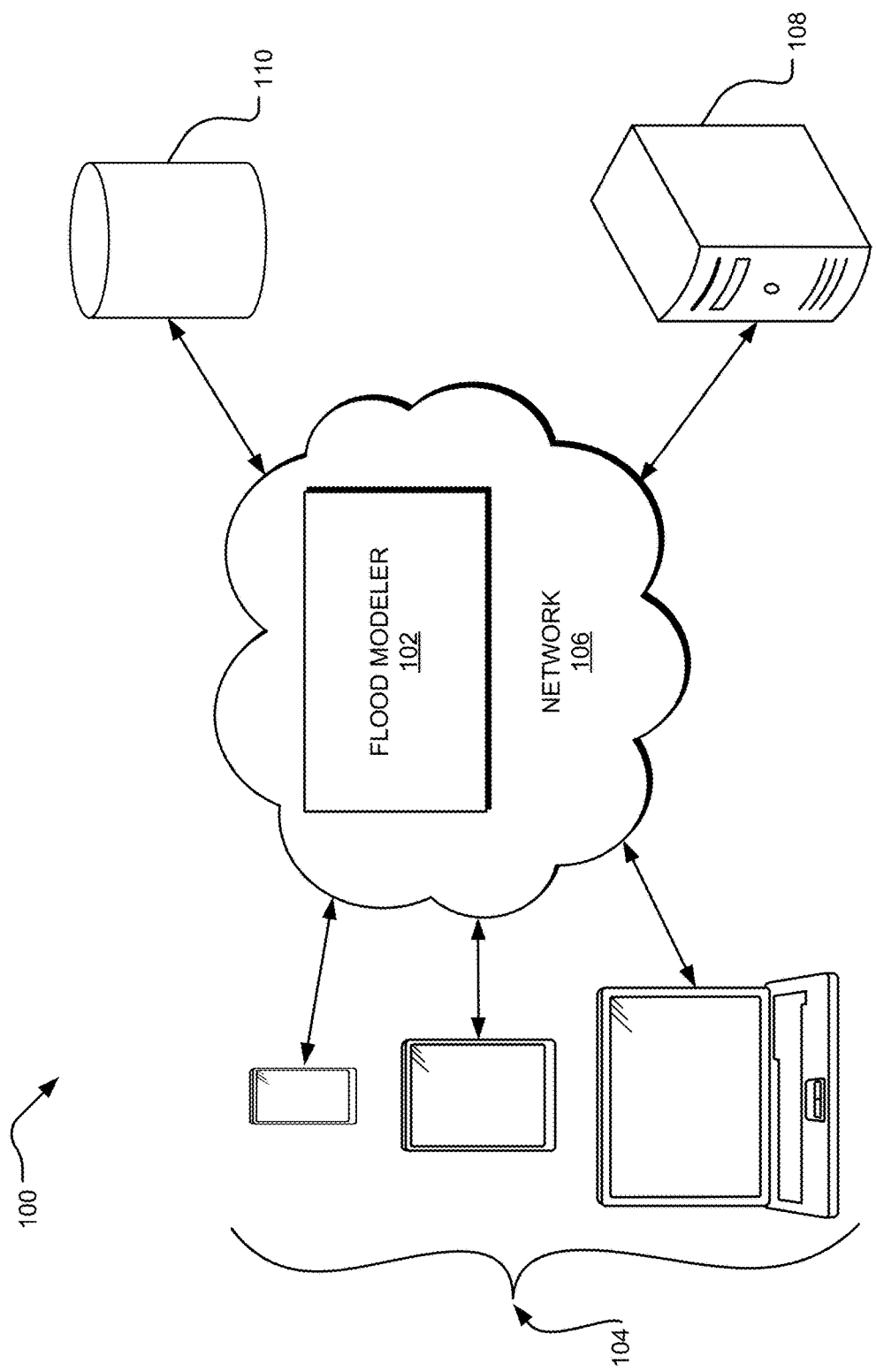
FIG. 1 is an example modeling system, including a flood modeling application running on a computer server or other computing device, for generating and analyzing flood hazard zone models.

Referring to FIG. 1, an example modeling system 100 for generating and analyzing flood hazard zone models using a flood modeler 102 is shown. In one implementation, the flood modeler 102 is executed by at least one processor of a user device 104. The user device 104 is generally any form of computing device, such as a personal computer, terminal, workstation, portable computer, mobile device, smartphone, tablet, multimedia console, or the like.

In another implementation, a network 106 (e.g., the Internet) is used by one or more computing or data storage devices to access and interact with the flood modeler 102. The network 106 includes a server 108 hosting a website or an application that the user may visit to access the flood modeler 102. The server 108 may be a single server, a plurality of servers with each such server being a physical server or a virtual machine, or a collection of both physical servers and virtual machines. In still another implementation, a cloud hosts one or more components of the modeling system 100. Computing or storage devices connected to the network 106 may access one or more other servers to access to one or more websites, applications, web services interfaces, storage devices, computing devices, or the like that are used to obtain, aggregate, and/or analyze data for flood hazard zone modeling. The server 108 may also host a search engine that the modeling system 100 uses for accessing, searching for, and modifying datasets, flood hazard zone models, and/or other modeling information. Flood hazard zone models and associated data may be stored in a database 110, which may be a single storage device or a plurality of storage devices.

As can be understood from FIG. 1, the flood modeler 102 receives various input layers, which may be stored in the database 110. The input layers may include, without limitation, hydrographic dataset vectors (e.g., National Hydrography Database ("NHD") vectors), watershed boundary dataset vectors (e.g., National Watershed Boundary Dataset ("WBD") vectors), elevation model datasets (e.g. NEXT-Map® USA DTM raster), and/or the like. The elevation model datasets may have aspects similar to those described in U.S. patent application Ser. No. 13/841,332, filed Mar. 15, 2013 and entitled "Method and Apparatus for Digital Elevation Model Systematic Error Correction and Fusion," which is hereby incorporated by reference in its entirety herein. In one implementation, the flood modeler 102 generates and outputs flood hazard model layers based on the input layers. The flood modeler 102 calculates flood level elevation for one or more cross profiles of a particular stream with parameters calibrated using historic flood event data.

In one implementation, the flood modeler 102 calculates a stream accumulation area and Strahler Order for each stream within a watershed. As used herein, the term stream refers to any body of water that flows via a current, including, without limitation, rivers, creeks, brooks, tributary streams, headwater streams, waterways, and other hydrological features. A watershed is a land area or topographical region that drains into a particular stream. One or more subwatersheds may be contained within a watershed, each draining into the particular stream.

The flood modeler 102 identifies relevant stream segments and creates a stream hierarchical structure based on the hydrographic dataset vectors and watershed boundary dataset vectors. The relevant stream segments may be identified, for example, based on whether the segments are: named, within economically important areas, and/or the like. The flood modeler 102 determines an accumulation area (e.g., in square kilometers) and a Strahler Order for each stream segment. The Strahler Order treats each stream within a stream network as a node in a mathematical tree, with the next segment downstream as its parent. The Strahler Order measures a branching complexity of a stream network with an index of a stream ranging from 1 (a stream with no tributaries) to 12 (the most powerful river at its mouth).

Once the Strahler Orders and accumulations areas are computed, in one implementation, the flood modeler 102 defines one or more cross profiles for a particular stream segment and computes the flood level elevation at each cross-profile sample location. Flood level elevation values at a final outputting grid are interpolated and combined with digital elevation modeling data to generate flood depths. Based on the convention that locations with positive flood depth are inside a flood zone and locations with negative or zero flood depth are outside of a flood zone, the flood modeler 102 delineates flood zones for each return period using the flood depths.

Stated differently, in one implementation, the flood modeler 102 defines one or more cross profiles in the relevant stream segments based on the accumulation area, Strahler Order, stream type, and intersection with adjacent streams and watershed boundaries. Areas having dense data, including elevation data, with high resolution (e.g., 5×5 meters) correspond to the cross profiles. The flood modeler 102 calculates the flood level elevation for selected points on the cross profiles based on parameters calibrated using historic flood event data. The flood modeler 102 generates a flood hazard zone model based on a combination of the flood level elevation samples and a digital elevation modeling dataset. The boundaries of the flood depth map for each flooding probability (return period) may be a layer over a map showing areas having varying flooding probabilities.

Various Figures disclosed herein depict example user interfaces generated by the flood modeler 102 and displayed with the user device 104. It will be appreciated by those skilled in the art that such depictions are exemplary only and not intended to be limiting.

Figure 2:
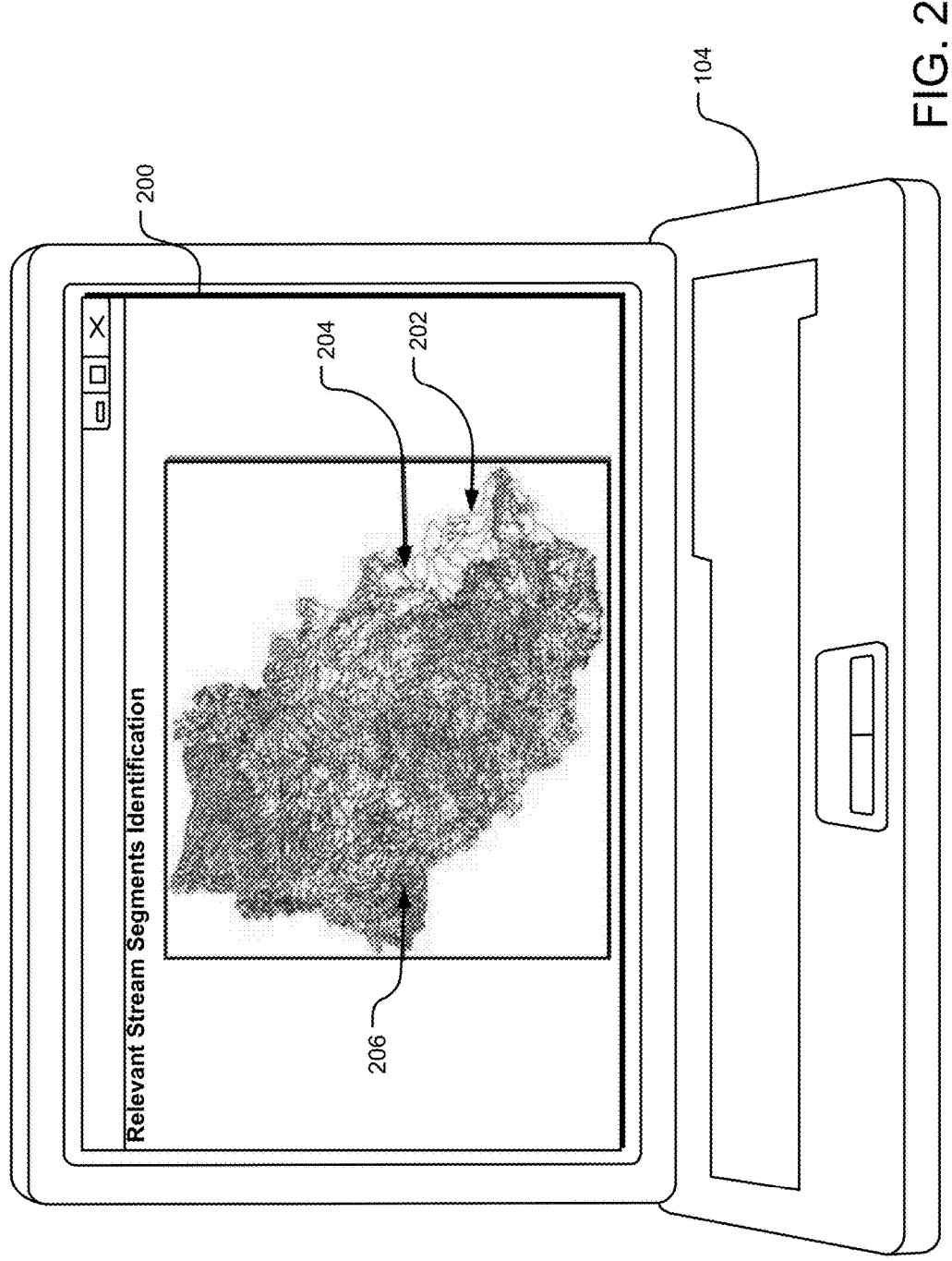
FIG. 2 shows an example user interface generated by the flood modeling application, the user interface being displayed in a browser window of a computing device and displaying the identified relevant stream segments and the input hydrologic units.

Turning to FIG. 2, a relevant stream segments identification user interface 200 generated by the flood modeler 102 is shown. The relevant stream segments identification user interface 200 shows stream center lines and subwatersheds.

In one implementation, the stream center lines are polylines obtained from a hydrographic dataset, such as the NHD, and the subwatersheds are polygons obtained from a watershed boundary dataset, such as the WBD. In the example illustrated in FIG. 2, the relevant stream segments identification user interface 200 shows subwatersheds with twelve digit hydrologic units 202.

Using the hydrographic dataset and the watershed boundary dataset, relevant stream segments 204 and non-relevant stream segments 206 are identified. In one implementation, the relevant stream segments 204 include segments of named streams and their downstream segments. Unnamed streams may represent other features, such as a wastewater collecting system or the like, or may not be named due to reference data being incomplete. The relevant stream segments 204 may include unnamed segments that are classified as "River/Streams" and are with an accumulation area exceeding a certain threshold value (for example, 10 km$^2$).

Figure 3:
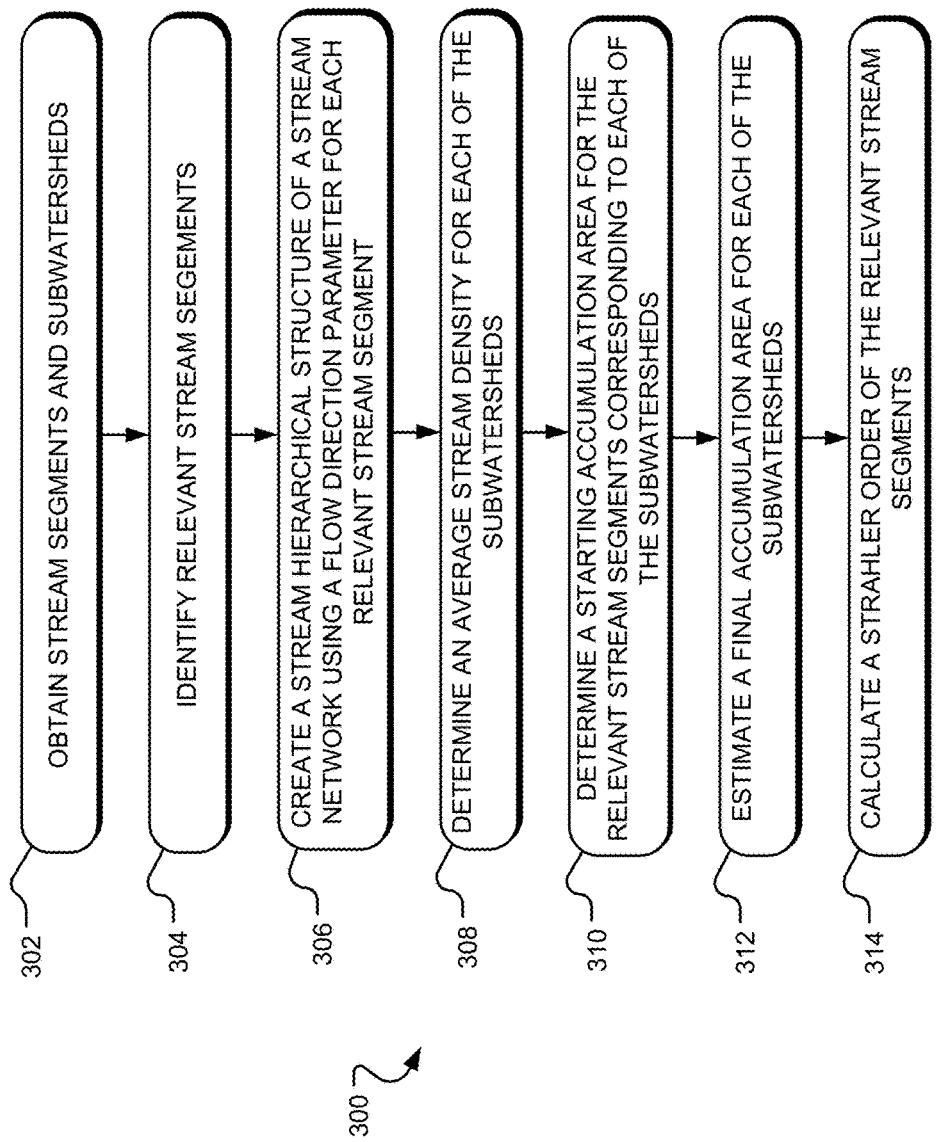
FIG. 3 illustrates example operations for determining a stream accumulation area and Strahler Order calculation, which are parameters of flood probability.

FIG. 3 illustrates example operations 300 for determining input parameters for flooding probability, including the stream accumulation area and the Strahler Order. In one implementation, an operation 302 obtains an input stream network, including stream segments and subwatersheds from a hydrographic dataset and a watershed boundary dataset. An operation 304 identifies one or more relevant stream segments from the input stream network. In one implementation, the operation 304 identifies the relevant stream segments by identifying segments of named streams and their downstream segments, as well as unnamed segments that have a relevant classification (e.g., classified as "River/Streams") and an accumulation area exceeding a threshold value.

In one implementation, the operation 304 confirms that each of the stream segments meeting another segment dissolves into single part features, such that the segments meet only at endpoints. Further, in one implementation, the operation 304 confirms that a relationship between the subwatersheds and stream segments is 1:N, such that the stream segments are cut by the subwatershed boundaries. The operation 304 may also verify a reference integrity of the stream centerline network and subwatersheds and/or check for the existence of any dead-end rivers without any downstream lines. An operation 306 determines a stream hierarchical structure of the input stream network using a flow direction parameter for each of the relevant stream segments.

An operation 308 calculates an average stream density for each of the subwatersheds. In one implementation, the average stream density is proportional to a total stream segment length divided by a subwatershed area. For each of the subwatersheds, an operation 310 estimates a starting accumulation area, $A_S$, for the relevant stream segments. In one implementation, the operation 310 estimates the starting accumulation area for segments that spring in the subwatershed at zero. For each inflow segment (i.e., stream segments that inflow into the subwatershed), the operation 310 estimates the starting accumulation area to equal a total area of all subwatersheds flowing into the inflow segment. The operation 310 estimates the starting accumulation area to be a sum of end accumulations of all tributary segments for any segments that start at confluence of two or more other segments.

For each of the subwatersheds, an operation 312 determines a final accumulation area for the relevant stream segments. In one implementation, the final accumulation area, $A_F$, is proportional to a sum of the starting accumulation area, $A_S$, and the product of the average stream density in the subwatershed, D, and the stream segment length, L. For example, the operation 312 may calculate the final accumulation area using the formula: $A_F=A_S+(D*L)$. In one implementation, for the segments that inflow into the subwatershed, the final accumulation area is equal to the total accumulation of all subwatersheds flowing into the inflow segment, and for segments that start at a confluence of two or more other segments, the final accumulation area is equal to the sum of all tributary accumulations. In one implementation, the operation 312 calculates an accumulation for subwatersheds that are also watered by a subwatershed without any segment.

An operation 314 determines a Strahler Order of each of the relevant stream segments. In one implementation, the Strahler logic is 1+1=2, 2+2=3, 3+3=4 and so on and 2+1=2, 3+1=3, 3+2=3 and so on. Stated differently, when two streams of the same order come together, they form a stream with a higher order (e.g., two first-order streams coming together form a second-order stream), but when streams of a lower order join a higher order stream, the order of the higher stream does not change (e.g., a first-order stream joining a second-order stream remains a second-order stream). As described herein, the Strahler Order of the relevant stream segments may be used to define one or more cross profiles in the relevant stream segments.

Figure 4:
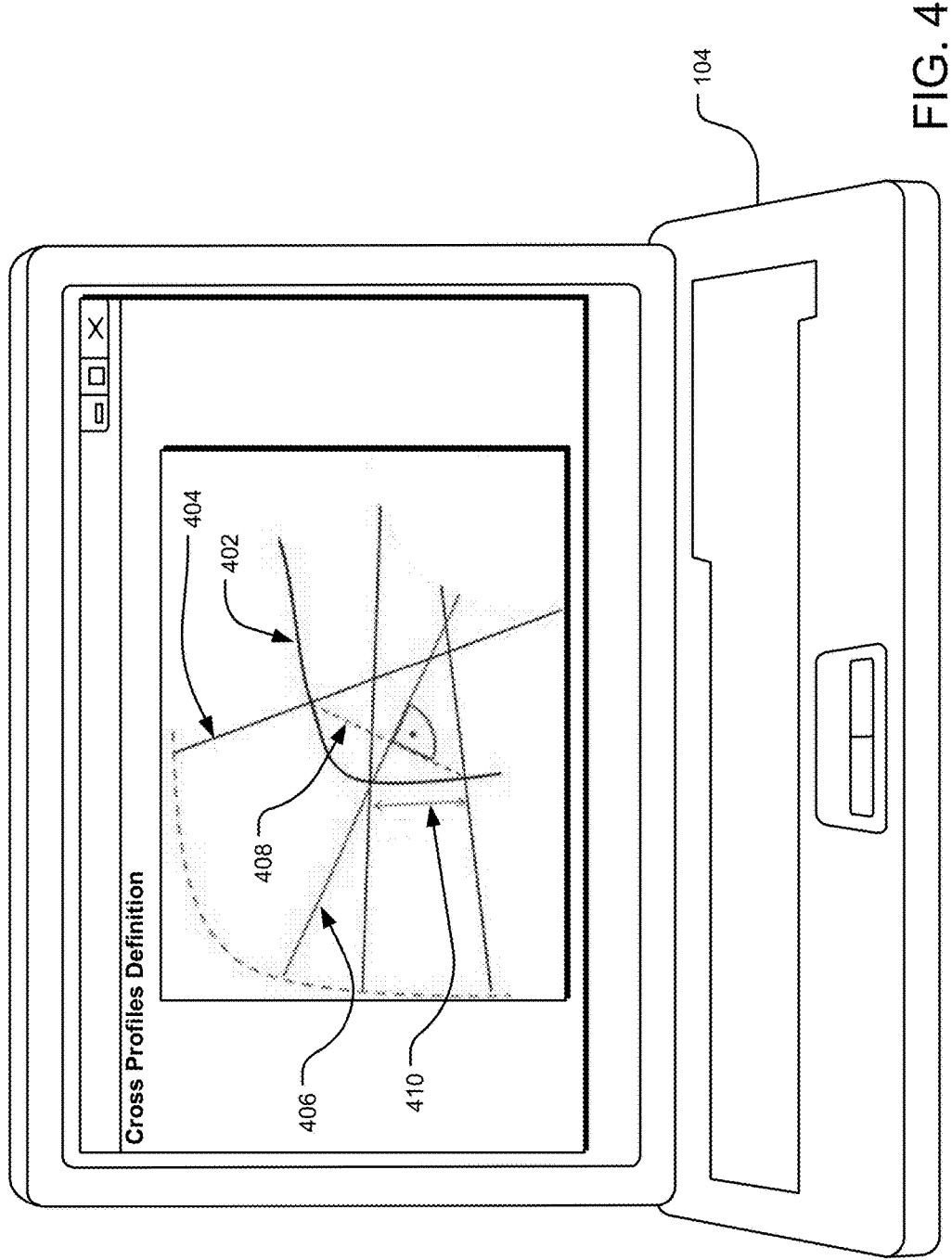
FIG. 4 shows the user interface displaying a definition of cross profiles.

For a detailed description of cross profiles definition, reference is made to FIG. 4, which shows a cross profiles definition user interface 400 generated by the flood modeler 102 and displayed with the user device 104.

As can be understood from FIG. 4, one or more cross profiles are defined across a stream segment 402. The cross profiles are lines that are orthogonal to the direction of the stream segment 402. In one implementation, each of the cross profiles are defined as a line 404 that is orthogonal to the direction of the stream segment 402 at a particular point. In another implementation, each of the cross profiles are defined as a line 406 that is orthogonal to a connecting line 408 between two neighboring points surrounding a particular point in the stream segment 402. Defining the cross profiles in this manner may eliminate minor changes of a direction of the stream segment 402, thereby resulting in less intersection points among the cross profiles. The line 406 may be adjusted some distance 410 based on a stream step parameter, as shown in FIG. 4. As described herein, in one implementation, the flood level elevation is calculated for selected points on the cross profiles.

Figure 5:
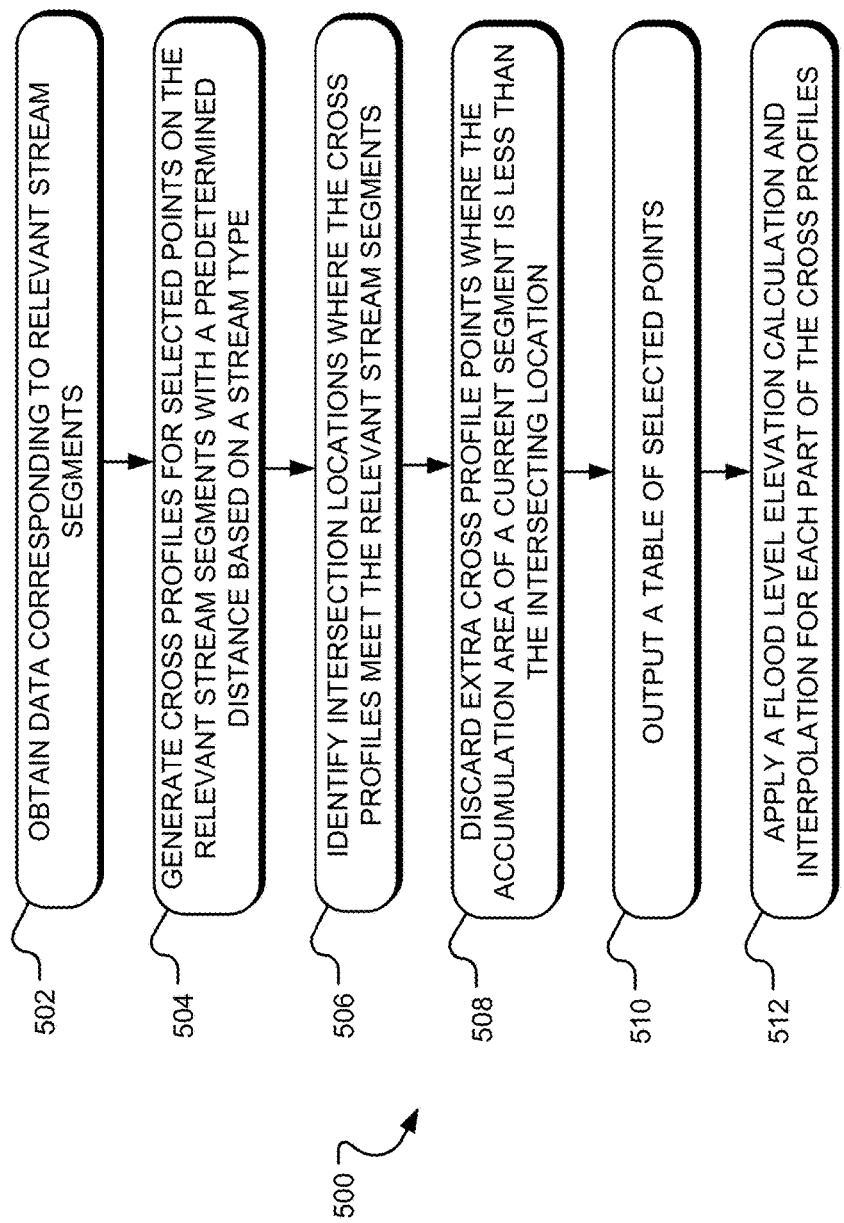
FIG. 5 illustrates example operations for cross profile generation.

FIG. 5 illustrates example operations 500 for calculating parameters for flood probability modeling. In one implementation, an operation 502 obtains data corresponding to relevant stream segments. The data may include, without limitation: an accumulation area for the relevant stream segments; a Strahler Order for the relevant stream segments; an elevation dataset; a stream step parameter; one or more cross profile step parameters; and guidelines to determine a size of each cross profile, depending on the Strahler Order, accumulation area, and stream type of the associated relevant stream segment.

An operation 504 defines one or more cross profiles for selected points on the relevant stream segment. In one implementation, the selected points are within a flood hazard area. Each cross profile consists of one or more parts (e.g., a left part and a right part). In one implementation, an operation 506 identifies locations where the cross profile parts intersect stream segments, and an operation 508 evaluates whether each of the cross profile parts need to be truncated. In one implementation, the operation 508 truncates cross profile parts that intersect another stream segment of equal or greater accumulation area than an original stream segment. Truncating such intersecting cross profile parts prevents the introduction of anomalous artifacts from stream segments with a lesser accumulation area. In one implementation, the operation 508 does not truncate cross profile parts that cross stream segments of lesser accumulation area.

Stated differently, in one implementation, if the cross profile part intersects the stream segment at another point, the operation 508 compares the accumulation area of the particular stream and the intersected stream and truncates the cross profile part only if the original stream has an equal or lesser accumulation area than the intersected stream. In one implementation, the operation 508 truncates the cross profile part according to a horizontal distance buffer to avoid processing points too far from the stream segment. The horizontal distance buffer is dependent on the Strahler Order, accumulation area, and stream type of the original stream. An operation 510 produces a table of selected points, each with a vertical and horizontal distance from the stream segment, an accumulation area, and a Strahler Order. The vertical distance is determined using samples extracted from the elevation modeling dataset. The table of selected points may be used for flood level elevation modeling.

In one implementation, an operation 512 calculates a flood level elevation for each of the selected points. The operation 512 may use a Multivariate Adaptive Regression Spline ("MARS") function to calculate the flood level elevation. In one implementation, the MARS function is a partly linear function of: a vertical distance of the selected point from the stream segment; a horizontal distance of the selected point from the stream segment; an accumulation area for the stream segment corresponding to the selected point; and a Strahler Order for the stream segment corresponding to the selected point. The MARS function may be different for each Strahler Order (e.g., 1-12) and flood hazard return period (e.g., 20, 50, 100, and 500 years). In one implementation, the operation 512 interprets flood level elevation values for each cell in the output grid, as described, for example, in FIG. 7.

Figure 6:
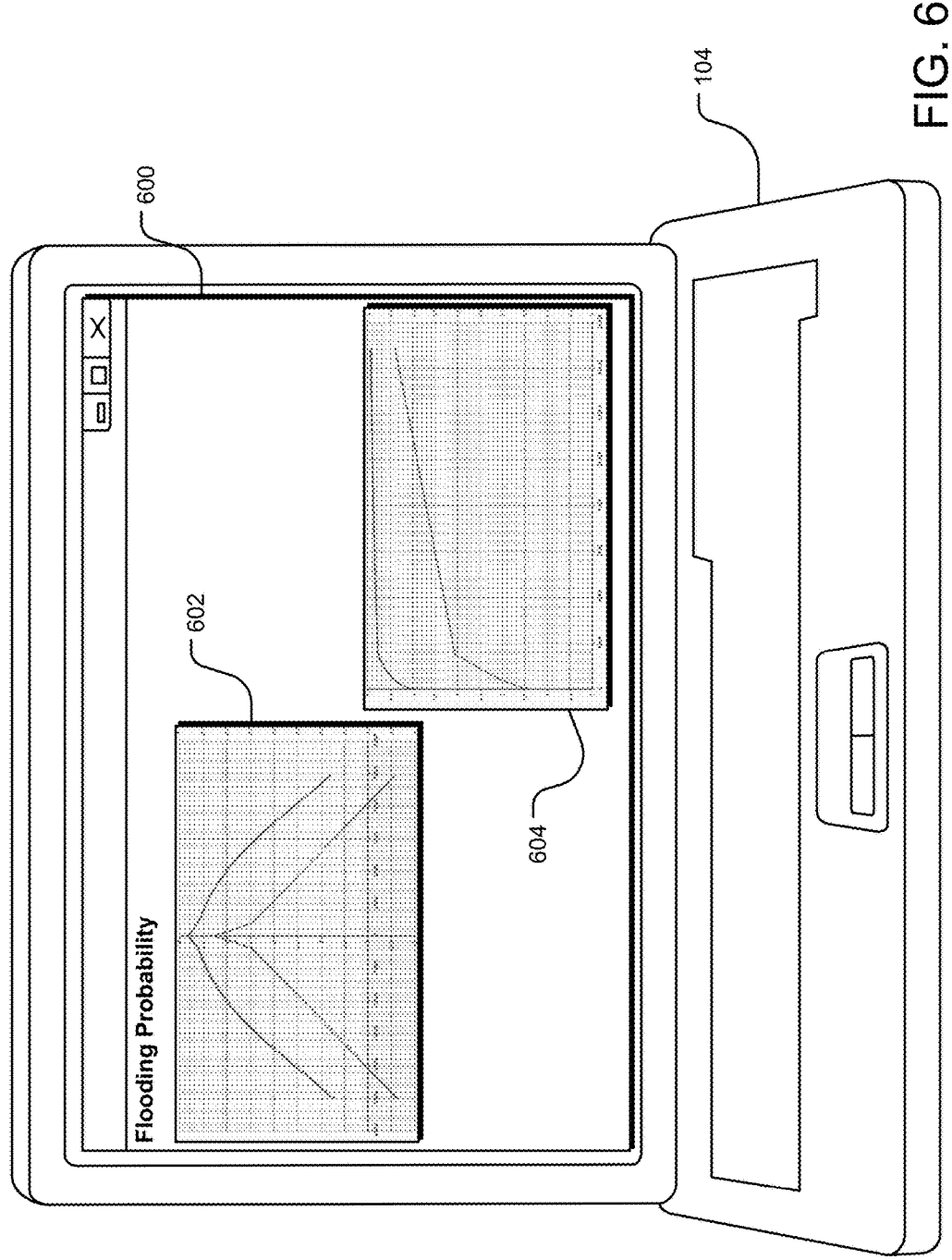
FIG. 6 shows the user interface displaying flood level elevation.

Turning to FIG. 6, a flood level elevation user interface 600 generated by the flood modeler 102 and displayed with the user device 104 is shown. In the example shown in FIG. 6, a MARS function is shown as the bottom function and a flood level elevation function is shown as the top function in two examples 602 and 604 of flooding probability. The example 602 shows a graph of the MARS function and the flood level elevation function with horizontal distance (meters) as an independent variable and a constant vertical distance and accumulation. The negative x-values in the example 602 represent a distance to a left side of the stream segment. The example 604 shows a graph of the MARS function and the flood level elevation function with an accumulation area (square kilometers) as an independent variable and a constant vertical distance and horizontal distance.

Figure 7:
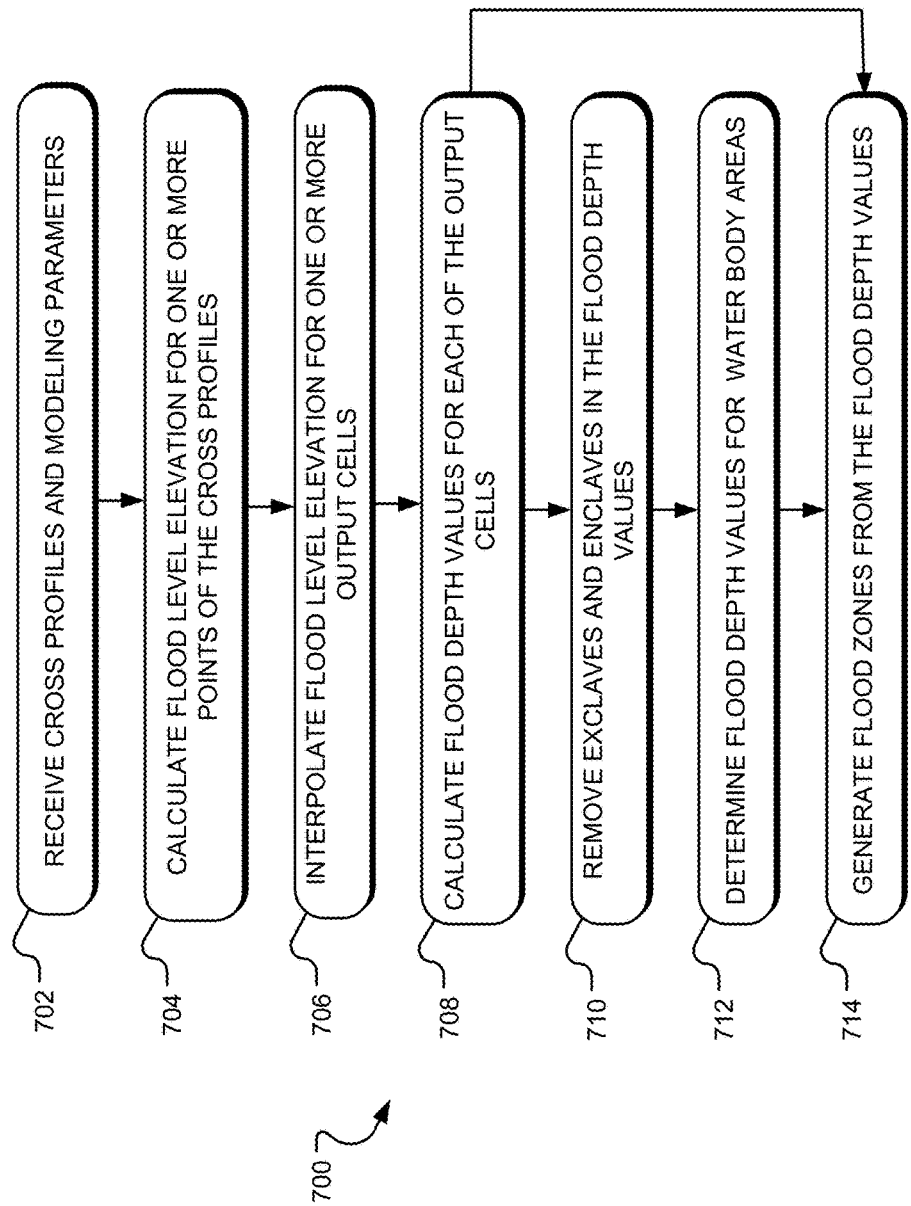
FIG. 7 illustrates example operations for flood hazard zone modeling.

Referring to FIG. 7, example operations 700 for flood hazard zone modeling are shown. In one implementation, an operation 702 receives one or more cross profiles for relevant stream segments, as described herein. The operation 702 may further receive an accumulation area and Strahler Order of the relevant stream segments. In one implementation, the operation 702 receives an elevation modeling dataset (e.g., NEXTMap® USA DTM) and one or more modeling parameters calibrated based on selected points from the cross profiles, as described herein. The calibrated parameters may include, without limitation: a stream step parameter (e.g., in meters); a cross profile step parameter (e.g., in meters); a set of horizontal distance buffer parameters, dependent on the Strahler Order and accumulation area (e.g., in meters); MARS function parameters; and/or the like.

In one implementation, an operation 704 generates flood level elevation measurements based on the cross profiles and the calibrated parameters. In one implementation, the operation 702 generates the cross profiles based on a return period of the stream step parameter. The operation 704 operates on each of the cross profile parts (e.g., left and right parts) and calculates the flood level elevation for the points on each of the cross profiles with the return period of the cross profile step parameter.

Figure 8:
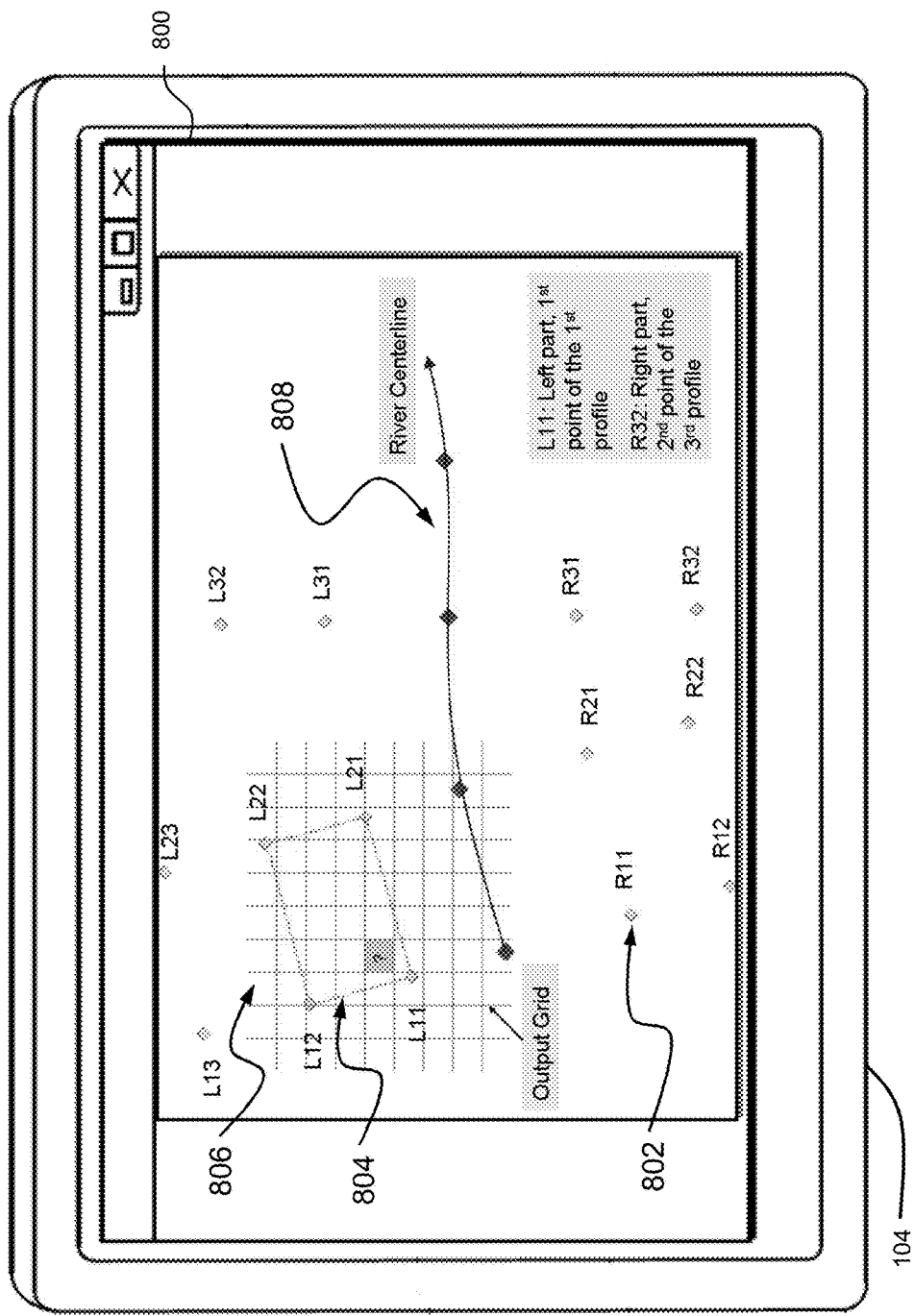
FIG. 8 illustrates flood level elevation interpolation using cross profile points.
Figure 9:
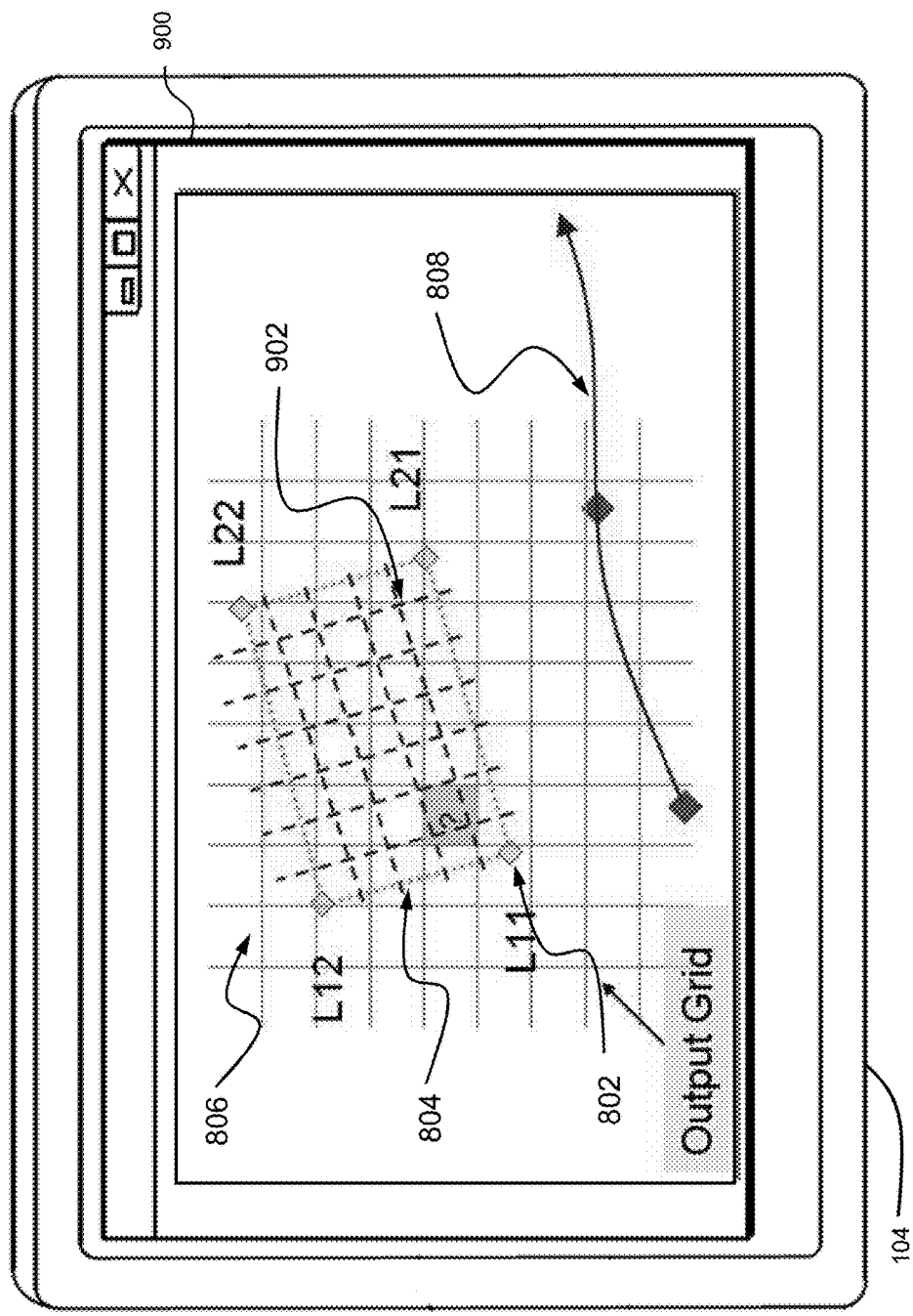
FIG. 9 illustrates quasi-bilinear interpolation of flood level elevation.

In one implementation, flood hazard zones are generated as raster grid representations of flooding depth derived from a combination of the cross profiles and a high-resolution elevation modeling dataset (e.g., NEXTMap® USA DTM). Referring to FIGS. 7-9, in one implementation, an operation 706 interpolates the flood level elevation from one or more output cells, such as cross profile samples 802 arranged in a grid, as shown in FIG. 8, at a regular pixel spacing that matches a sample spacing of the elevation modeling dataset. An example of such grid is shown as 806 in FIGS. 8 and 9. In one implementation, to interpolate the flood level elevation, the operation 706 identifies adjacent cross profiles and applies a quasi-bilinear interpolation of flood level elevation between neighboring cross profile sample points that form a quadrangle 804 surrounding the desired pixels. A quasi-bilinear interpolation user interface 900 is illustrated in FIG. 9, where the quadrangle 804 is divided into cells 902 (e.g., small non-square cells) where a bilinear interpolation is performed. An operation 708 computes flood depth values for each of the output cells as the raster difference between the flood level elevation grid and the elevation modeling dataset. Using the flood depth values, an operation 714 generates one or more flood hazard zones. In one implementation, the operation 714 produces a flood depth map for each desired return period (e.g. 20 years, 100 years, or 500 years) and defines the flood hazard zones as any locations with a positive flood depth for a given return period.

Figure 10:
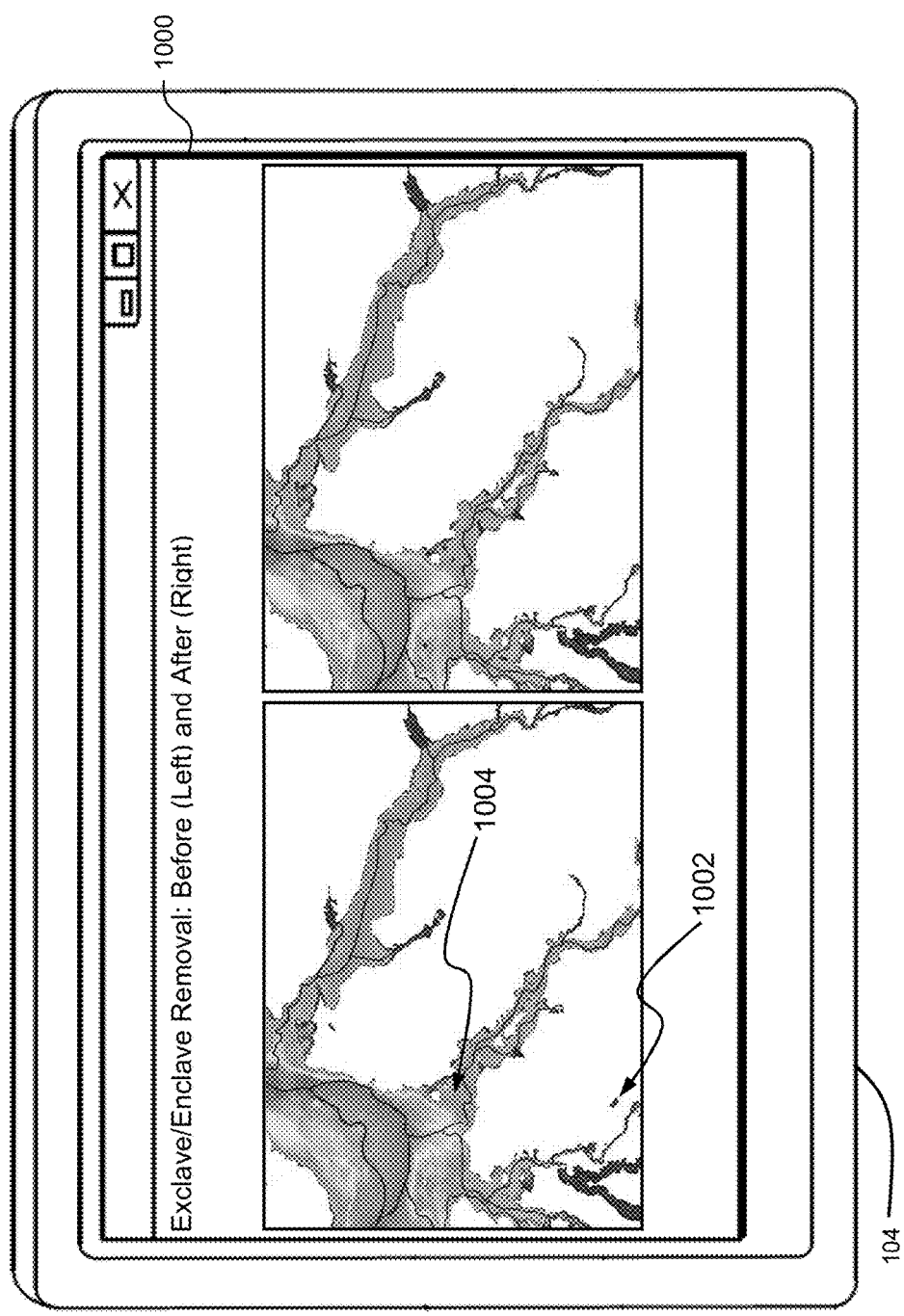
FIG. 10 shows the user interface displaying flood depth maps before and after exclave/enclave removal.

Operations 710 and 712 may be performed for flood zone refinement. In one implementation, the operation 710 removes exclaves and enclaves in post-processing. Exclaves are any flood zone pixels (i.e. pixels with flood depth>0) that are not connected to any river segments. One such example is shown as exclave 1002 in the user interface 1000 illustrated in FIG. 10. In one implementation, the operation 710 identifies exclaves by employing a rasterization process to produce raster representations of the relevant stream segments. The operation 710 performs a region growing operation on the rasterized relevant stream segments, parameterized to suit the resolution of the flood modeling dataset. Enclaves are any non-flood-zone regions (i.e. areas with zero or negative flood depth) which are smaller than a prescribed area chosen to suit the resolution of the flood modeling dataset (e.g. less than 100 5-meter pixels). One such example is shown as enclave 1004 in the user interface 1000 illustrated in FIG. 10. The operation 710 interpolates identified enclaves from the surrounding flood depth pixels in the flood depth raster grid.

Figure 11:
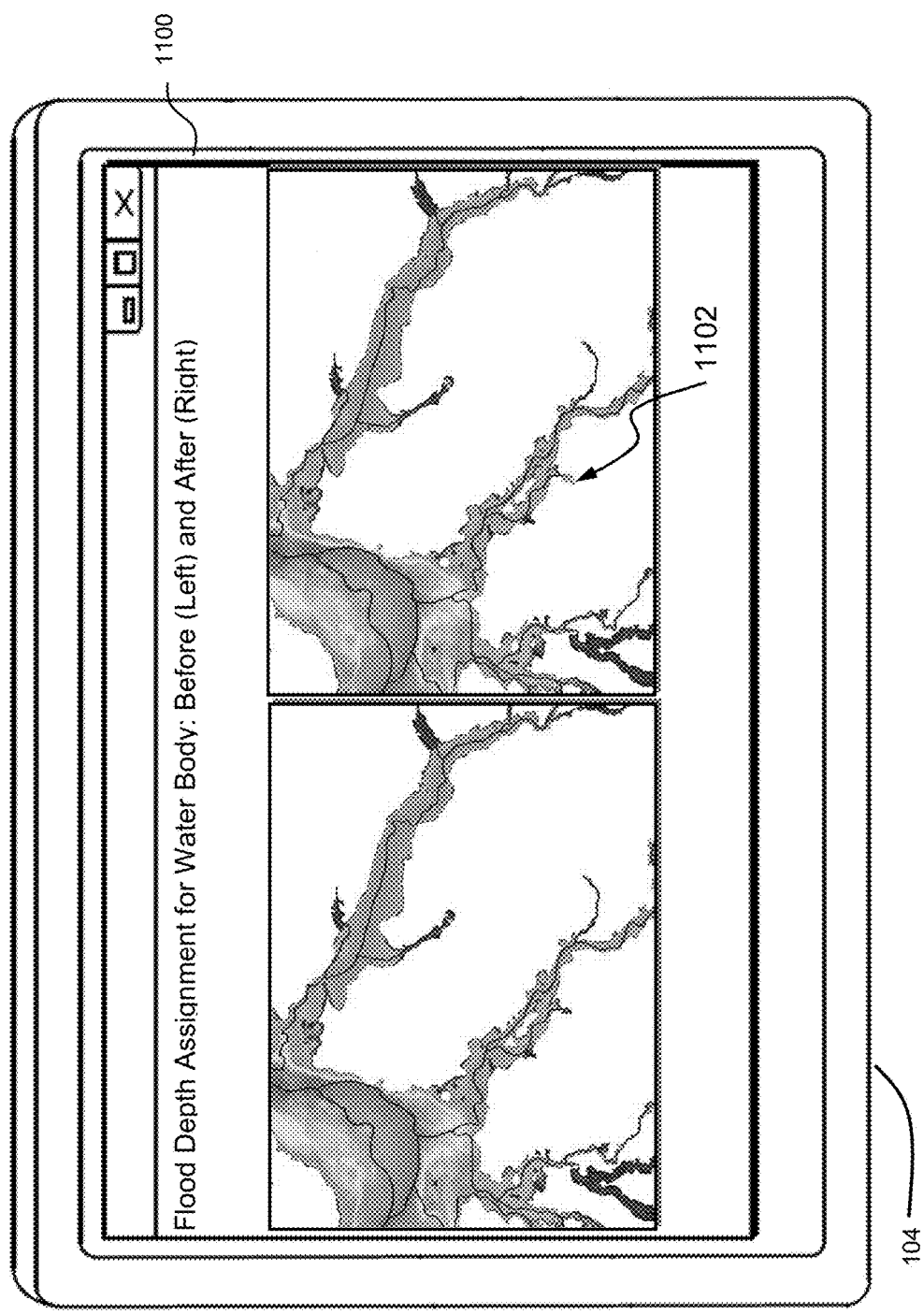
FIG. 11 shows the user interface displaying flood depth maps before and after water body stamping.

In one implementation, the operation 712 refines the flood zones by stamping in water body boundaries from the input hydrologic dataset (e.g. NHD waterbodies). The operation 712 may use a rasterization operation to produce raster representations of the NHD water bodies. Options for assigning flood depth values to stamped NHD waterbodies include, but are not limited to, using a median of valid flood depth values from the operation 708; using a minimum flood depth value for a given return period; and/or the like. An example user interface 1100 displaying the result of operation 712 assigning a flood depth 1102 for a water body is illustrated in FIG. 11.

Figure 12:
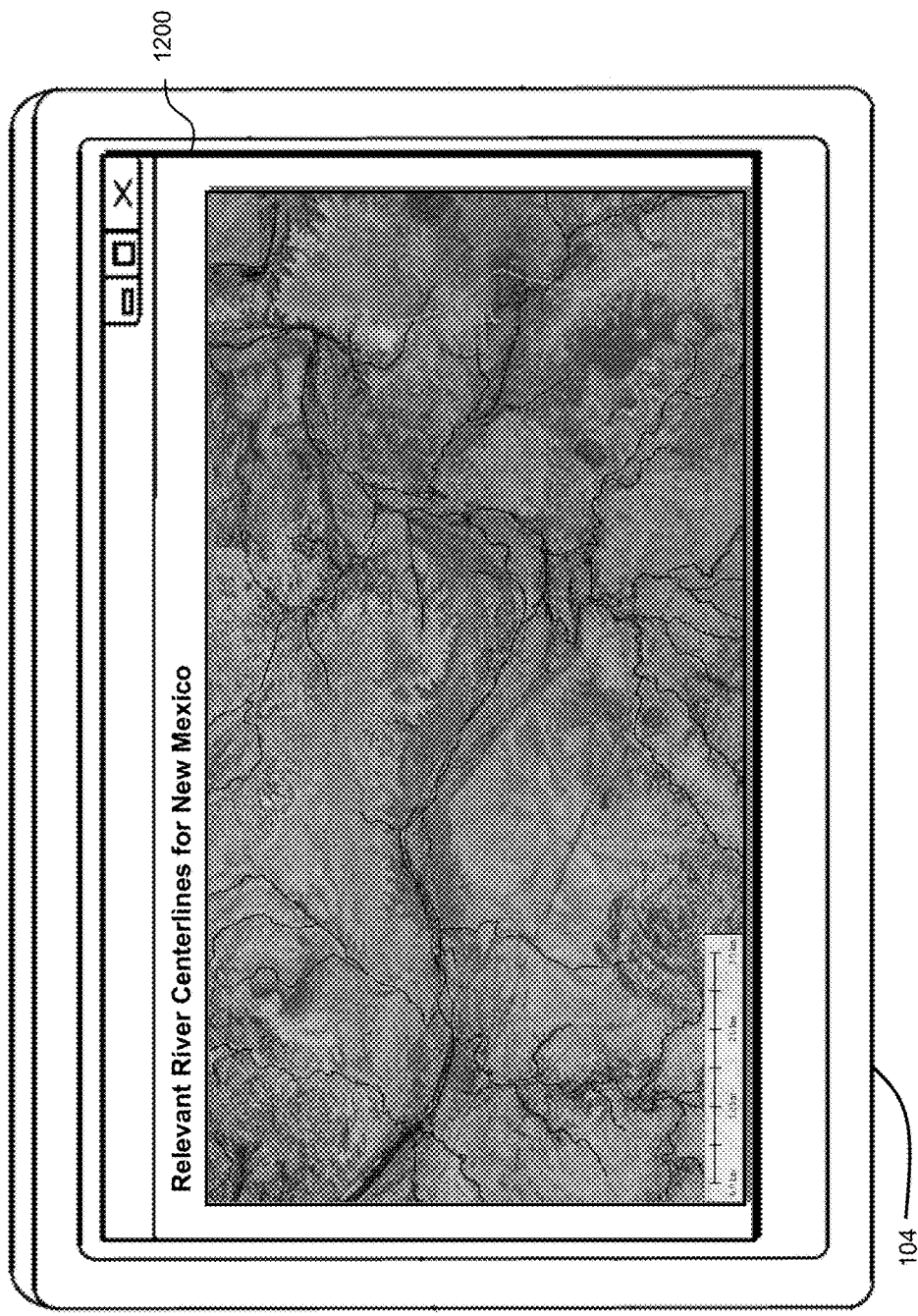
FIG. 12 shows the user interface displaying identified relevant river centerlines for a region in New Mexico.
Figure 13:
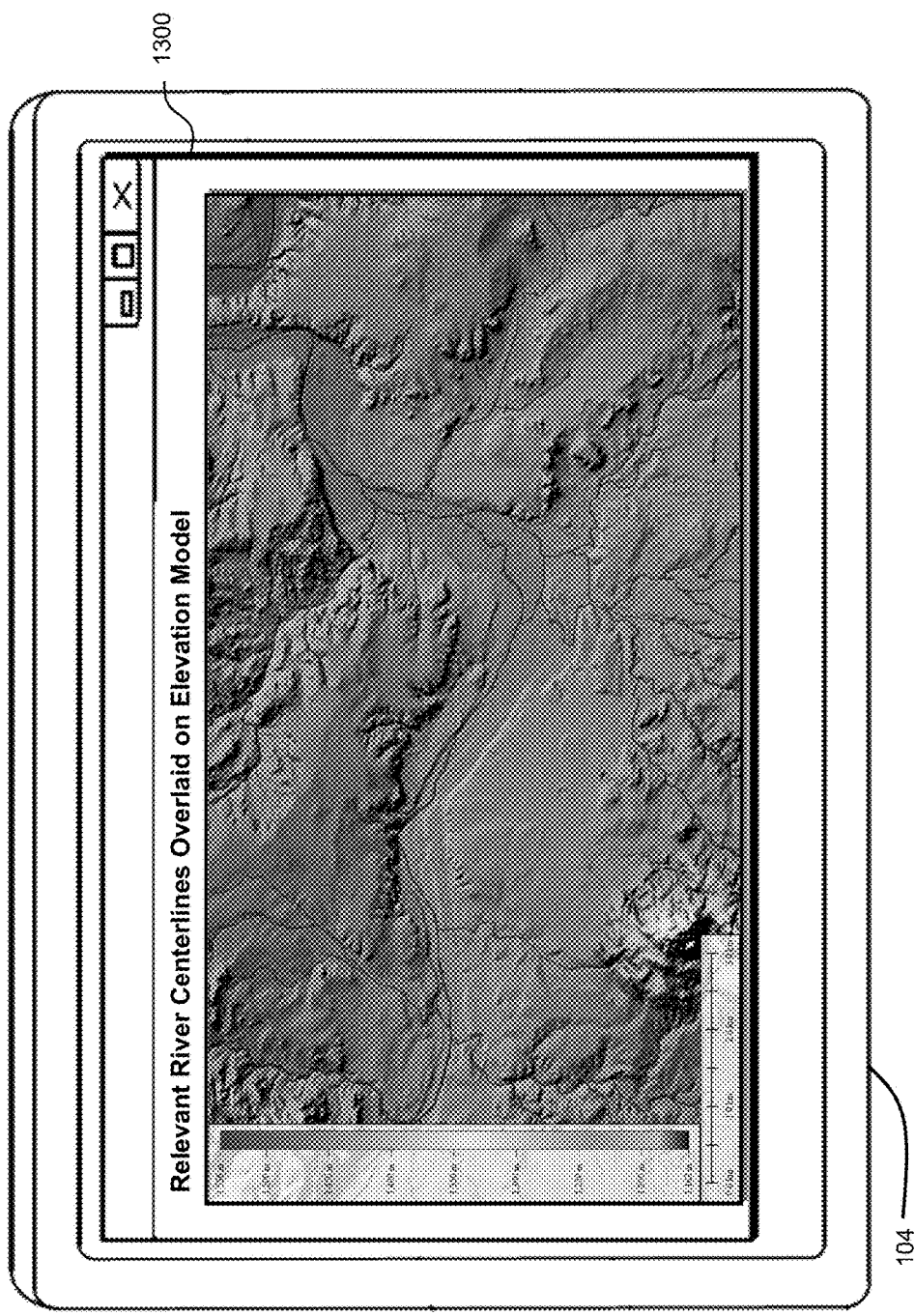
FIG. 13 shows the user interface displaying identified relevant river centerlines overlaid on input high resolution elevation models.
Figure 14:
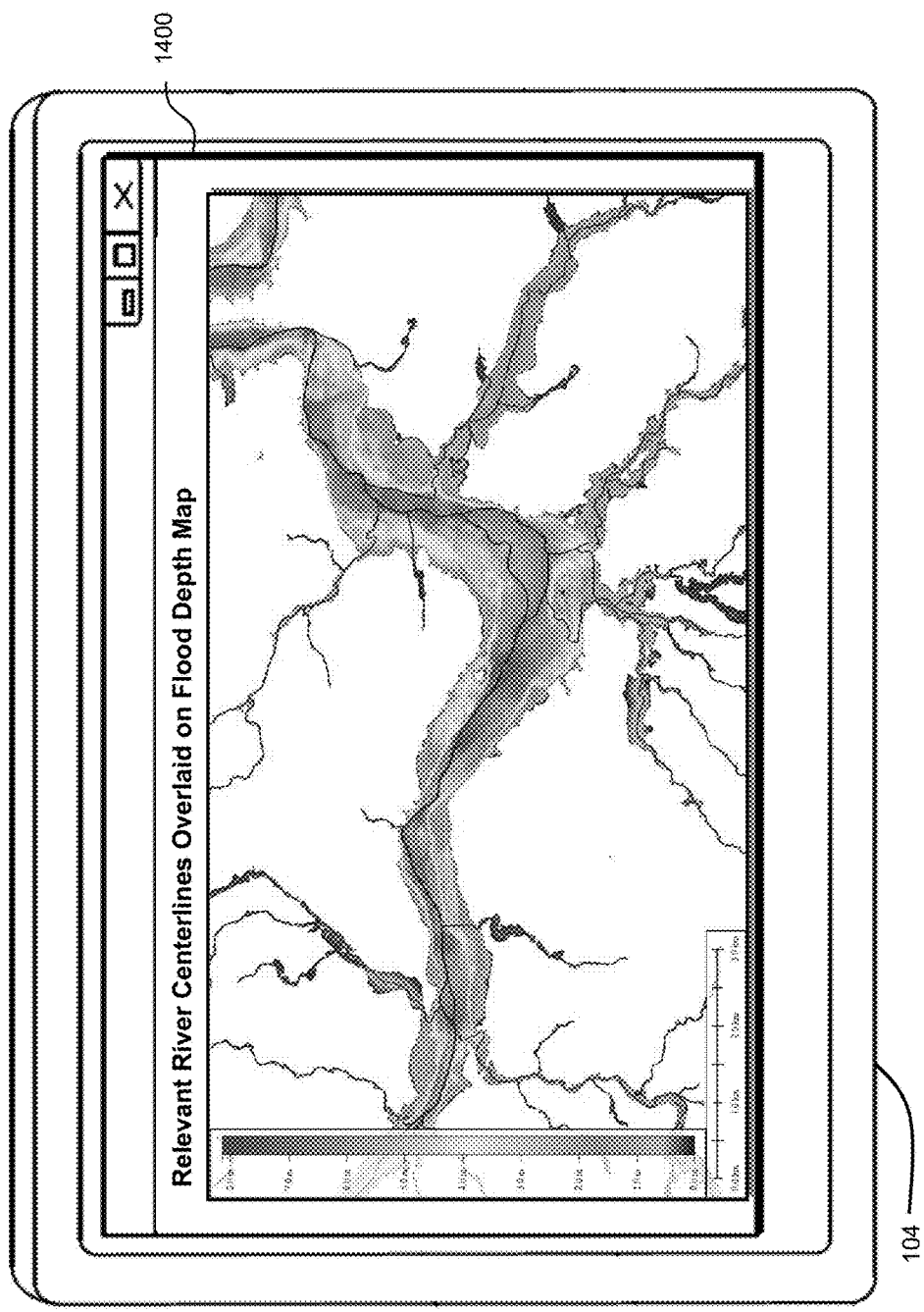
FIG. 14 shows the user interface displaying identified relevant river centerlines overlaid on estimated flood depth maps for a return time period (RTP) of 100 years.

FIGS. 12-14 show example flood zone model user interfaces 1200-1400 generated by the flood modeler 102 and displayed with the user interface 104. Specifically, the flood zone model user interface 1200 displays an example river network for a region in New Mexico. A user may zoom in to look at the river network in more detail, referring to the underlying imagery for context. The flood zone model user interface 1300 displays a high resolution digital terrain model in New Mexico which may be input to generate a flood hazard zone model. The flood zone model user interface 1400 displays a flood depth map for a region in New Mexico, corresponding to a modeled flood with return time period of 100 years.

Figure 15:
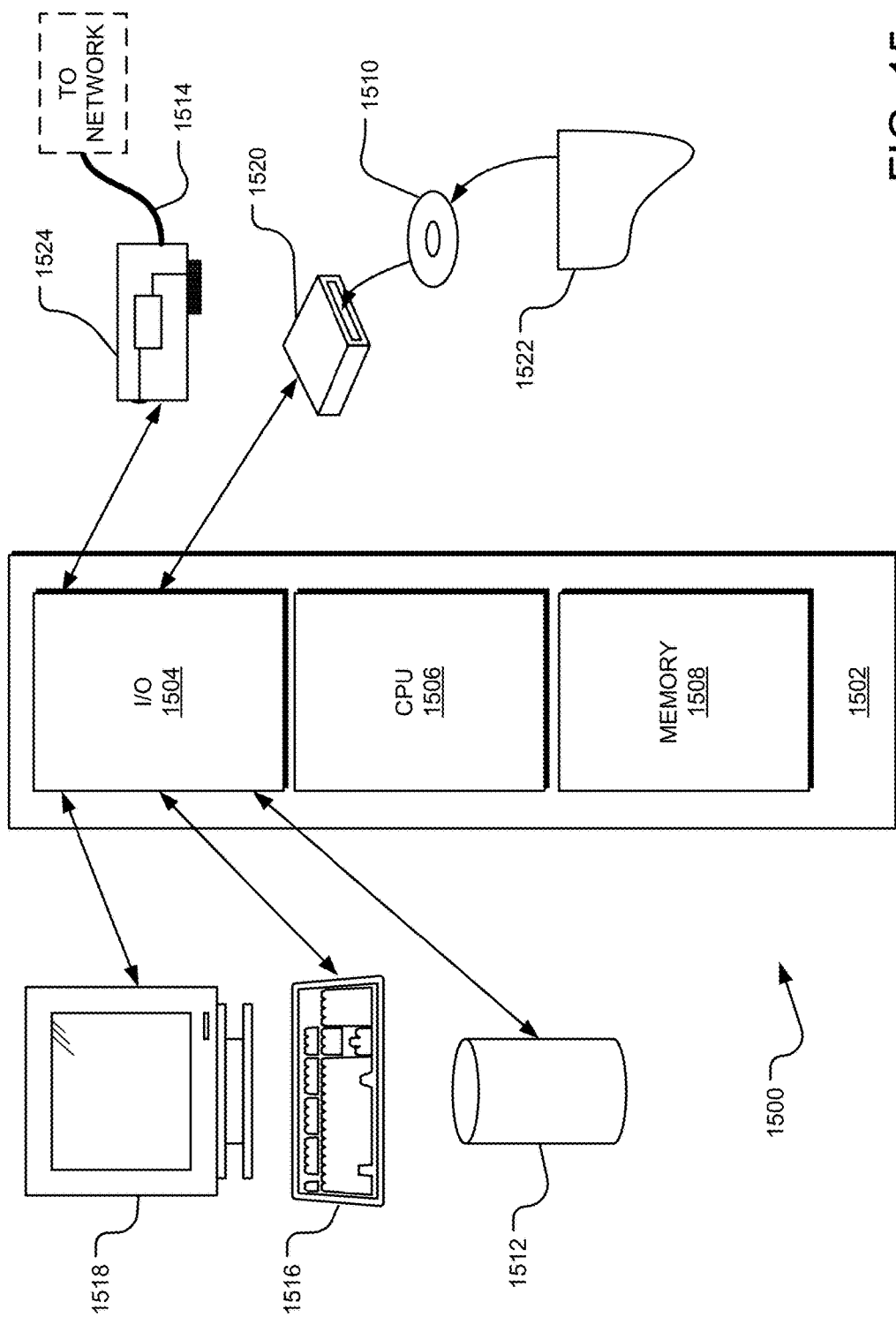
FIG. 15 is an example of a computing system that may implement various systems and methods discussed herein.

Referring to FIG. 15, a detailed description of an example computing system 1500 having one or more computing units that may implement various systems and methods discussed herein is provided. The computing system 1500 may be applicable to the user devices 104, the server 108, and/or other computing devices. It will be appreciated that specific implementations of these devices may be of differing possible specific computing architectures not all of which are specifically discussed herein but will be understood by those of ordinary skill in the art.

The computer system 1500 may be a general computing system is capable of executing a computer program product to execute a computer process. Data and program files may be input to the computer system 1500, which reads the files and executes the programs therein. Some of the elements of a general purpose computer system 1500 are shown in FIG. 15 wherein a processor 1502 is shown having an input/output (I/O) section 1504, a Central Processing Unit (CPU) 1506, and a memory section 1508. There may be one or more processors 1502, such that the processor 1502 of the computer system 1500 comprises a single central-processing unit 1506, or a plurality of processing units, commonly referred to as a parallel processing environment. The computer system 1500 may be a conventional computer, a distributed computer, or any other type of computer, such as one or more external computers made available via a cloud computing architecture. The presently described technology is optionally implemented in software devices loaded in memory 1508, stored on a configured DVD/CD-ROM 1510 or storage unit 1512, and/or communicated via a wired or wireless network link 1514, thereby transforming the computer system 1500 in FIG. 15 to a special purpose machine for implementing the described operations.

The I/O section 1504 is connected to one or more user-interface devices (e.g., a keyboard 1516 and a display unit 1518), a disc storage unit 1512, and a disc drive unit 1520. In the case of a tablet device, the input may be through a touch screen, voice commands, and/or Bluetooth connected keyboard, among other input mechanisms. Generally, the disc drive unit 1520 is a DVD/CD-ROM drive unit capable of reading the DVD/CD-ROM medium 1510, which typically contains programs and data 1522. Computer program products containing mechanisms to effectuate the systems and methods in accordance with the presently described technology may reside in the memory section 1504, on a disc storage unit 1512, on the DVD/CD-ROM medium 1510 of the computer system 1500, or on external storage devices made available via a cloud computing architecture with such computer program products, including one or more database management products, web server products, application server products, and/or other additional software components. Alternatively, a disc drive unit 1520 may be replaced or supplemented by an optical drive unit, a flash drive unit, magnetic drive unit, or other storage medium drive unit. Similarly, the disc drive unit 1520 may be replaced or supplemented with random access memory (RAM), magnetic memory, optical memory, and/or various other possible forms of semiconductor based memories commonly found in smart phones and tablets.

The network adapter 1524 is capable of connecting the computer system 1500 to a network via the network link 1514, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets, laptops, personal computers, multimedia consoles, gaming consoles, set top boxes, and the like.

When used in a LAN-networking environment, the computer system 1500 is connected (by wired connection or wirelessly) to a local network through the network interface or adapter 1524, which is one type of communications device. When used in a WAN-networking environment, the computer system 1500 typically includes a modem, a network adapter, or any other type of communications device for establishing communications over the wide area network. In a networked environment, program modules depicted relative to the computer system 1500 or portions thereof, may be stored in a remote memory storage device. It is appreciated that the network connections shown are examples of communications devices for and other means of establishing a communications link between the computers may be used.

In an example implementation, flood modeling data, hydrographic dataset vectors, watershed boundary dataset vectors, flood hazard dataset vectors, elevation model datasets, calibrated parameters, the flood modeler 102, a plurality of internal and external databases (e.g., the database 110), source databases, and/or data cache on cloud servers are stored as the memory 1508 or other storage systems, such as the disk storage unit 1512 or the DVD/CD-ROM medium 1510, and/or other external storage devices made available and accessible via a cloud computing architecture. Flood modeling software and other modules and services may be embodied by instructions stored on such storage systems and executed by the processor 1502.

Some or all of the operations described herein may be performed by the processor 1502. Further, local computing systems, remote data sources and/or services, and other associated logic represent firmware, hardware, and/or software configured to control operations of the flood modeler 102, the user devices 104, and/or other computing units or components of the flood modeling system 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1502 and a user may interact with a Graphical User Interface (GUI) using one or more user-interface devices (e.g., the keyboard 1516, the display unit 1518, and the user devices 104) with some of the data in use directly coming from online sources and data stores. The system set forth in FIG. 15 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium; read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for flood hazard modeling, the method comprising:
   identifying one or more relevant stream segments from an input stream network using at least one computing unit;
   defining one or more cross profiles for one or more selected points on the relevant stream segments using the at least one computing unit, the selected points located within a flood hazard area;
   generating a high resolution flood level elevation map using the at least one computing unit, the high resolution flood level elevation map generated by interpolating flood level elevation from the selected points;
   generating a flood depth map using the at least one computing unit, the flood depth map having a flood depth value for each of the selected points computed as a difference between the interpolated flood level elevation and a terrain elevation; and
   defining one or more flood zones in the flood depth map using the at least one computing unit, the flood zones having a positive flood depth for a return period, wherein the flood zones are refined by removing enclaves and exclaves from the flood depth map.

2. The method of claim 1, wherein the one or more relevant stream segments include at least one of: segments of named streams; downstream segments of the segments of named streams; or unnamed segments having a relevant classification and an accumulation area exceeding a threshold value.

3. The method of claim 1, wherein one or more parts of the cross profiles are truncated based on locations where the parts intersect the one or more relevant stream segments.

4. The method of claim 3, wherein the one or more parts of the cross profiles are truncated where the parts intersect a stream segment with an equal or greater accumulation area than an original stream segment.

5. The method of claim 1, wherein one or more parts of the cross profiles are truncated according to a horizontal distance buffer.

6. The method of claim 1, wherein the horizontal distance buffer depends on a Strahler Order and an accumulation area.

7. The method of claim 1, wherein the flood level elevation is interpolated by applying a quasi-bilinear interpolation of the flood level elevation between neighboring selected points.

8. The method of claim 1, wherein the one or more flood zones are refined by assigning flood depth values to water bodies.

9. The method of claim 1, wherein the terrain elevation is determined using a high resolution elevation modeling dataset.

10. The method of claim 1, wherein the flood level elevation is calculated using a multivariate adaptive regression spline function.

11. One or more non-transitory tangible computer-readable storage media storing computer-executable instructions for performing a computer process on a computing system, the computer process comprising:
   identifying one or more relevant stream segments from an input stream network;
   defining one or more cross profiles for one or more selected points on the relevant stream segments, the selected points located within a flood hazard area;

generating a high resolution flood level elevation map by interpolating flood level elevation from the selected points, wherein the flood level elevation is calculated using a multivariate adaptive regression spline function;

generating a flood depth map having a flood depth value for each of the selected points computed as a difference between the interpolated flood level elevation and a terrain elevation; and defining one or more flood zones in the flood depth map, the flood zones having a positive flood depth for a return period.

12. The one or more non-transitory tangible computer-readable storage media of claim 11, wherein the one or more relevant stream segments include at least one of: segments of named streams; downstream segments of the segments of named streams; or unnamed segments having a relevant classification and an accumulation area exceeding a threshold value.

13. The one or more non-transitory tangible computer-readable storage media of claim 11, wherein the one or more parts of the cross profiles are truncated where the parts intersect a stream segment with an equal or greater accumulation area than an original stream segment.

14. The one or more non-transitory tangible computer-readable storage media of claim 11, wherein one or more parts of the cross profiles are truncated according to a horizontal distance buffer depending on a Strahler Order and an accumulation area.

15. The one or more non-transitory tangible computer-readable storage media of claim 11, wherein the flood level elevation is interpolated by applying a quasi-bilinear interpolation of the flood level elevation between neighboring selected points.

16. The one or more non-transitory tangible computer-readable storage media of claim 11, wherein the flood zones are refined by removing enclaves and exclaves from the flood depth map.

17. The one or more non-transitory tangible computer-readable storage media of claim 11, wherein the flood zones are refined by assigning flood depth values to water bodies.

18. The one or more non-transitory tangible computer-readable storage media of claim 11, wherein the terrain elevation is determined using a high resolution elevation modeling dataset.

19. A method for flood hazard modeling, the method comprising:

identifying one or more relevant stream segments from an input stream network using at least one computing unit, wherein the one or more relevant stream segments include at least one of: segments of named streams; downstream segments of the segments of named streams; or unnamed segments having a relevant classification and an accumulation area exceeding a threshold value;

defining one or more cross profiles for one or more selected points on the relevant stream segments using the at least one computing unit, the selected points located within a flood hazard area, wherein one or more parts of the one or more cross profiles are at least truncated (i) where the parts intersect a stream segment with an equal or greater accumulation area than an original stream segment or (ii) according to a horizontal distance buffer depending on a Strahler Order and an accumulation area;

generating a high resolution flood level elevation map using the at least one computing unit, the high resolution flood level elevation map generated by interpolating flood level elevation from the selected points;

generating a flood depth map using the at least one computing unit, the flood depth map having a flood depth value for each of the selected points computed as a difference between the interpolated flood level elevation and a terrain elevation; and defining one or more flood zones in the flood depth map using the at least one computing unit, the flood zones having a positive flood depth for a return period.

* * * * *